April 16, 1957 H. ANDERSON ET AL 2,789,126
VAPOR PHASE PROCESS FOR PRODUCTION OF ACRYLONITRILE
Filed Jan. 26, 1953 2 Sheets-Sheet 2
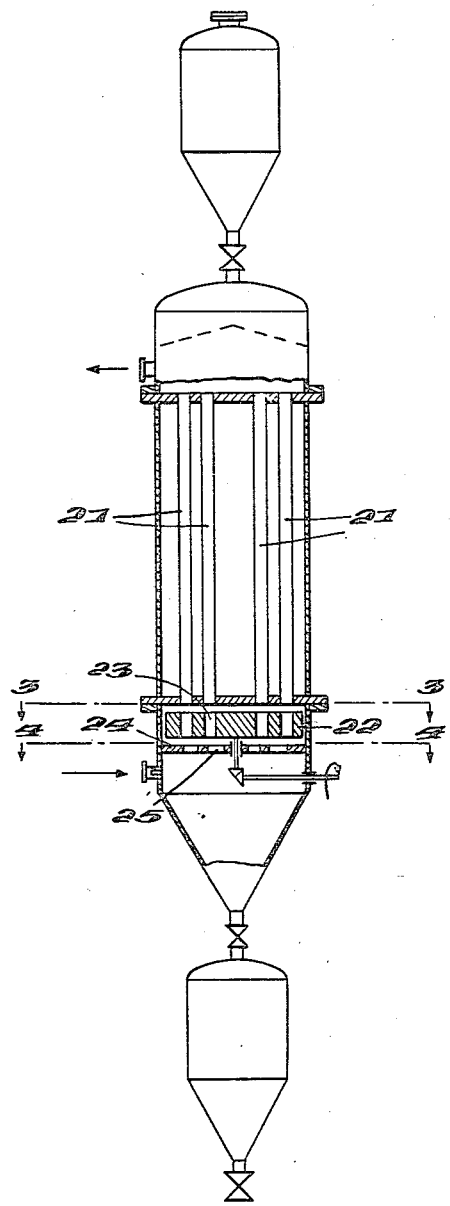
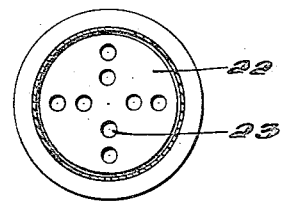
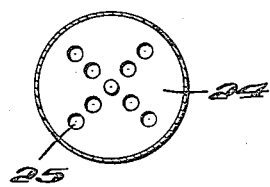
INVENTORS
HARALD ANDERSON
ERICH ASENDORF
HANS BERNSTORFF
BY Bailey, Stephens & Huettig
ATTORNEYS

United States Patent Office 2,789,126
Patented Apr. 16, 1957

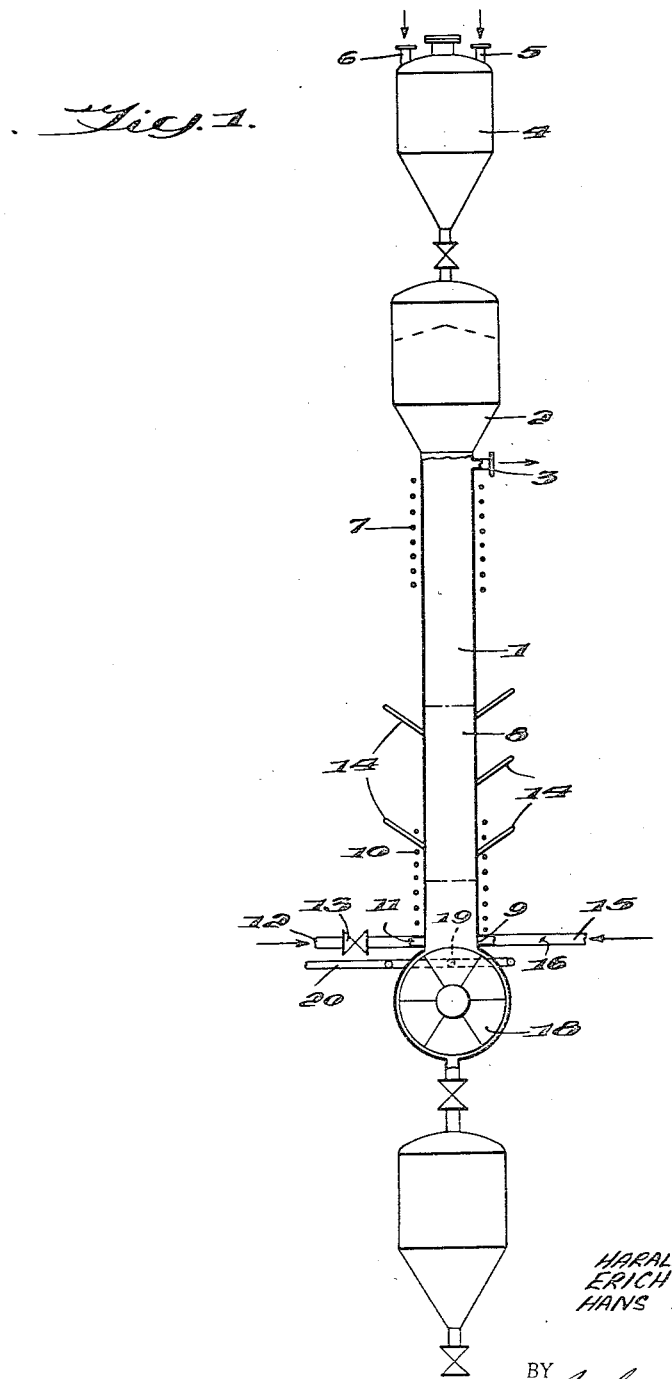

2,789,126

VAPOR PHASE PROCESS FOR PRODUCTION OF ACRYLONITRILE

Harald Anderson, Frankfurt am Main, Erich Asendorf, Bad Homburg, and Hans Bernstorff, Frankfurt am Main, Germany, assignors to Deutsche Gold- und Silber-Scheideanstalt vormals Roessler, Frankfurt am Main, Germany Application January 26, 1953, Serial No. 333,094

Claims priority, application Germany January 25, 1952

15 Claims. (Cl. 260—465.3)

The present invention relates to a process for the production of acrylonitrile by the catalytic conversion of acetylene and hydrocyanic acid in the gas phase and an apparatus therefor.

The gas phase production of acrylonitrile by catalytic conversion of acetylene and hydrocyanic acid upon a technical scale provides a number of difficulties which have not been satisfactorily overcome by the previously known processes. As the conversion takes place at relatively high temperatures, for example, between 600 and 700° C., the thermal instability of the reactants, especially acetylene, can have an extremely undesirable influence upon the course of the reaction. Even a slight decomposition of acetylene with the separation of carbon black suffices under unfavorable conditions, to promote and accelerate further decomposition and can lead to a spontaneous if not explosive course of the decomposition reaction.

Also, the strongly exothermic character of the formation of acrylonitrile renders the control and regulation of the conversion when carried out in a larger scale operation rather difficult as lags in the reaction easily occur which when released cause local overheating because of the rapid release of large quantities of heat which give rise to undesirable acceleration of the reaction and can in some instances reach the stage that the entire reaction fails.

Furthermore, in the previously known processes, the life of the catalyst is in many instances relatively short or at least they only give optimum yields over a short period. For this reason it was not possible to obtain acrylonitrile over long periods of time and to carry out the reaction continuously.

In accordance with the present invention the production of acrylonitrile by the catalytic conversion of acetylene and hydrocyanic acid is carried out continuously and contrary to the processes of the prior art the catalyst is continuously passed through the reaction chamber. In accordance with the invention the catalyst is passed through the catalyst chamber countercurrent to the reaction gases. In this way it is possible to adjust the time the catalyst remains in the actual reaction zone to the requirements of the process and to the optimal life of the catalyst. In other words the catalyst is only permitted to remain in the reaction zone as long as it has its optimum activity by suitably adjusting its rate of flow through the reaction chamber and the more or less spent portions are continuously replaced with fresh catalyst. A further advantage of employing a catalyst which flows countercurrent to the reaction gases resides in that the fresh reaction gases first contact substantially spent catalysts so that at the boundary of the reaction zone, the reaction only commences gradually, which among other things substantially or completely avoids the occurrence of the above-mentioned dangerous reaction lags. With progress of the conversion the gases contact increasingly fresh catalyst so that finally the last remnants of unconverted gases come into contact with completely unused catalyst. Consequently the process according to the invention provides the optimum conditions for obtaining the greatest possible conversion.

It has been found extremely advantageous according to the invention to pass the reaction gases through the reaction chamber at a high velocity. This is of advantage as in order to insure safety of the process it is necessary that the reaction gases rich in acetylene traverse the space between the inlet to the reaction chamber and the reaction zone, that is, the temperature between the inlet and the reaction temperature, as quickly as possible. Consequently according to the invention the gaseous reactants are passed through the reaction chamber with a speed which is a multiple, in fact, 200 to 1500 times and preferably 500 to 1000 times the speed of the catalyst which flows countercurrently thereto. The high gas velocities employed provide substantial economical advantages as they render high throughputs possible.

Especially good results were obtained with reference to high throughputs and optimum use of the catalyst if the gas velocity is raised to just below the dancing point of the catalyst employed. In this connection, the "dancing point" signifies the gas velocity, which can be ascertained by simple routine tests, at which the solid catalyst is in equilibrium with the force of gravity without being carried along by the gases and therefore to a certain extent floats upon the gases flowing therethrough and can be passed countercurrent to the gas stream flowing therethrough by the application of a slight opposing pressure. This method of operation renders it possible to regulate the speed of the catalyst substantially independently of the action of gravity in a simple manner so that the time the catalyst remains in the reaction zone can be adjusted very easily. For example, if a catalyst is employed whose dancing point lies at a velocity of the reaction gases of between 0.4 and 0.5 meter per record, the velocity of the catalyst through a reaction chamber 2 meters long is so selected that the catalyst remains in the chamber for 30 to 60 minutes.

In order to repress the decomposition of the acetylene as much as possible before it enters the reaction zone, the introduction of the reaction gases into the reaction chamber is effected as close as possible to the beginning of the actual reaction zone. In this manner the critical temperature range of the decomposition is rapidly passed through with the high velocities employed according to the invention without effecting preheating of the gases to an undesirable high temperature by the hot spent catalyst leaving the reaction zone. On the other hand, loss of heat from the hot catalyst engendered by contact with the cooler fresh reaction gases, automatically limits the reaction zone in the direction of the entering reaction gases whereby any premature instigation of the reaction, in a measure worth mentioning, is effectively prevented. Preferably the reaction gas mixtures are preheated to some extent before being introduced into the reaction but in the case that undiluted gases are employed in the reaction mixture, it is preferable that the preheating not be in excess of about 200–220° C.

In accordance with the invention, the operational safety of the process can be substantially increased by diluting the reaction gases with an inert gas before being passed through the reaction zone. Preferably the preheated inert gas and the reaction gases are introduced into the reaction chamber separately and are permitted to mix only at a point just preceding the reaction zone. The diluent gas, for example, nitrogen, can be preheated with the hot gaseous reaction products. However, it is also possible to preheat the inert gas by permitting it to flow through the spent catalyst on its way to the reaction zone before it leaves the reaction chamber. The latter procedure has the advantage that not only is the heat remaining in the spent catalyst removed to a great extent but also any reaction gases or reaction products clinging thereto are also removed. Consequently the spent catalyst is easier and less dangerous to handle or if desired to purify or regenerate.

As has already been indicated the diluent gas can partly or entirely be introduced separately from the reaction gases and consequently can be regulated independently thereof with respect to temperature, as well as with respect to quantity and velocity. It is possible in this way to regulate the length of the reaction zone to a certain extent, for example, by increasing the quantity of the diluent gas, the reaction zone can be lengthened along its longitudinal axis. This measure also permits a more certain regulation of the reaction as it prevents the evolution of large quantities of heat in too small a space.

Also, as indicated above, overheating phenomena occurring in the reaction zone can lead to a sudden increase in the speed of conversion which in turn leads to the sudden release of larger quantities of heat and renders the regulation and control of the reaction to a degree required to ensure proper progress of the reaction difficult. Consequently, in accordance with a special modification of the invention, an inert cool flushing gas is introduced into the reaction zone upon occurrence of overheating therein, and at the same time the introduction of the reaction gases is cut off or at least reduced until the surge in the reaction has died out. For this purpose, thermometers or thermostats are provided in various portions of the reaction zone so that the course of the reaction in the various zones can be supervised. Preferably, thermostats are employed which automatically control the introduction of the flushing gas and the cutting off of the reacting gases. Such thermostats, for example, are set to react at a certain temperature, so that when this is reached they automatically introduce the flushing gas and throttle the reacting gases supplied so that the temperature is reduced to that desired. These measures permit a safe control of the complicated and sensitive reaction upon which the process, according to the invention, is based and consequently permit the production of acrylonitrile from acetlyene and hydrocyanic acid with the greatest operational safety.

The reaction gases for the process of the invention, namely, the acetylene and hydrocyanic acid can be mixed before introduction into the reaction chamber. The process according to the invention moreover, permits such a far reaching control over the progress of the reaction that it can be carried out without regard to the state and, especially, the purity of the gases with high rates of conversion and yields of acrylonitrile. Consequently, it has been found advantageous to employ, as the synthesis gas mixture, the reaction mixture containing approximately equivalent quantities of acetylene and hydrocyanic acid resulting from the conversion of hydrocarbons, especially methane, and an excess of nitrogen in an electric arc. Such resulting gas mixtures which also contain nitrogen and hydrogen can, according to the invention, be introduced into the reaction chamber after cooling to below 650° C., and do not require any special previous purification. Expediently, the gas mixture leaving the electric arc is cooled to about 550 to 600° C. with attendant separation of carbon black carried along by the gases and is then introduced into the reaction chamber. However, as the gas mixtures pass through a quantity of spent catalyst on their way from the inlet to the actual reaction zone they are purified to a certain extent, at least mechanically.

In case the reaction is to be carried out in the presence of inert gases, the electric arc reaction for the production of the synthesis gas mixture can itself be carried out with a considerable excess of nitrogen. In this way it is not only possible to employ considerably less additional inert gas but it is also possible to avoid preheating large quantities of the inert gas. It is preferable, however, not to supply all of the inert diluent gas admixed with the synthesis gas as the separate introduction of inert gas provides a number of possibilities for regulating and controlling the reaction. In any event, however, the direct use of synthesis gas mixtures containing acetylene and hydrocyanic acid formed by the electric arc process permits a simplified and economical process for the production of acrylonitrile.

It was found that the catalyst preferably should enter into the reaction zone with a temperature of 450° to 580° C. in order to achieve as rapid a reaction and as far reaching a conversion as possible. Temperatures between 520° and 550° C. have been found especially favorable for this. Even though the catalyst will be preheated to a certain extent during the passage through the reaction chamber to the reaction zone countercurrent to the hot gases leaving the reaction zone, the resulting heat exchange is not sufficient to raise the catalyst temperature to the desired temperature range. It is therefore advantageous to provide for additional heating of the catalyst, preferably electrical heating, on its way to the reaction zone.

The preheating zone for the catalyst in the reaction chamber is preferably made as long as possible so as to facilitate the heat exchange between the hot reaction products and the cold catalyst progressing towards the reaction zone. Furthermore, a certain forming of the catalyst takes place in the preheating zone, which especially adapts it to convert the remaining acetylene and hydrocyanic acid still contained in the hot substantially completely reacted gases passed countercurrently therethrough, into acrylonitrile.

A number of substances can be employed for the catalysts used, according to the invention, both with regard to the carriers and the actual catalytically active substrates. Very good results are obtained with active carbons and especially activated wood charcoals. Fine pored active carbons as can be produced by steam activation have been found especially suitable. With such active carbons a rapid and more complete reaction is achieved if they were activated in the presence of alkali metal compounds. In this connection it was found that the activity was especially favorably influenced by carrying out the activation in the presence of potassium compounds. Similar results are also obtainable if wood charcoal is shaped with alkali containing binders and tar and then activated, if desired again in the presence of alkali. Especially fine pored carbons are obtained thereby, which, as indicated above, are particularly suited as catalysts for the process, according to the invention. For example, carbons come into consideration in which the maximum of the pore distribution lies at pore sizes below 1 M $\mu$ and whose take up in benzene amounts to at least 10%, from an air current one thousandths saturated with benzene. For the production of such active carbons, wood charcoal dust can, for example, be pressed into shapes together with alkali liquor and tar and activated with steam at 800 to 1000° C., after carbonization at 400 to 600° C. In accordance with the invention, the active carbons activated with alkali metal compounds, especially potassium compounds, which still contain 10% or more of alkali metal compounds after activation are employed without washing as the catalyst for the production of acrylonitrile.

It is also possible to influence the catalyst's activity by impregnating active carbons before use with alkali metal compounds especially alkali metal hydroxides and, if desired, also with alkaline earth metal compounds such as, for example barium salts which act as promoters as described in Patent No. 2,502,678.

The many possibilities for controlling and influencing the process, according to the invention, give considerable latitude to the choice of the catalyst employed so that in addition to the catalysts named, a large number of other materials can be employed. While particle sizes of 3 to 6 mm. have been found particularly suitable when active carbons are employed as the catalyst, the particular size can be varied considerably with other catalysts depending upon the other conditions selected for the reaction. An excellent catalytic action was observed when mercury vanadate was employed.

The use of finely divided or highly porous catalysts or catalyst carriers in certain circumstances gives rise to the danger that not inconsequential quantities of air may be carried into the reaction chambers along with the catalyst, which can give rise to difficulties, especially upon reacting with the sensitive acetylene. Consequently, according to the invention, it is proposed to remove the air contained in the active carbon of the catalyst before it is introduced into the reaction chamber by subjecting it to a vacuum treatment at a moderately elevated temperature, and then introducing it under an inert gas into the reaction chamber without renewed contact with air. The catalyst is preferably conveyed pneumatically especially as in view of the high opposing pressure of the reaction gases passing countercurrently upwardly therethrough, it is necessary to pass the catalyst downwardly with the aid of a slightly raised pressure. This measure together with the high velocities of the reaction gases, furthermore, provides the advantage, that the reaction chamber is constantly under a slightly raised pressure which effectively prevents infiltration of oxygen containing gases into the reaction chamber which might lead to explosive reactions with the acetylene. The above mentioned degasification and preheating of the catalyst is of special importance in certain circumstances when active carbon is employed as the catalyst, as the active carbon is substantially freed of water which otherwise might, in the presence of alkalies, lead to decomposition of the acrylonitrile formed with consequent lowering of the yield obtained.

In selecting the material for the construction of the apparatus for carrying out the process according to the invention, care should be taken that such materials are avoided which might catalyze undesirable side reactions. There are, for example, a number of corrosion and scale resistant steels as the austenitic chromium nickel steels which in certain circumstances decompose hydrocarbons with strong formation of carbon black. Unexpectedly, however, it was found that such decomposition could be substantially avoided by employing low alloy steels which are composed of up to 0.27% C, 1.5% to 9% Cr, 0.5% to 1.5% Al and remainder Fe. Such alloys may also contain silicon and/or titanium in quantities of about 0.3% to 1.5%. Such steel alloys which have only slightly active surfaces are known under the tradename "Sicromal" and can be employed for the construction of at least those portions of the apparatus which come into contact with the reaction gases and products at high temperatures.

The apparatus serving for the process according to the invention is primarily characterized by the arrangement for moving the catalyst through the reaction chambers. Several modifications of apparatus suitable for carrying out the process according to the invention are shown by way of example in the accompanying drawings, in which:

Fig. 1 diagrammatically shows one form of apparatus for carrying out the process.

Fig. 2 diagrammatically shows a modified form of such apparatus.

Fig. 3 is a cross sectional view of the apparatus shown in Fig. 2 taken along line A—B, and Fig. 4 is a cross-sectional view of the apparatus shown in Fig. 2 taken along line C—D.

Referring to Fig. 1, 1 designates the actual reaction chamber which in the present modification is in the form of an upright tube. A funnel shaped enlargement 2 is provided at the upper end of reaction chamber 1 from which the catalyst is introduced into the reaction chamber. An outlet is provided below this catalyst chamber for removing the reaction products. Connected to the upper end of the catalyst chamber a bunker 4 is provided which serves for the degasification and if desired preheating of the catalyst. For this purpose an outlet 5 for connection to a vacuum line and an inlet 6 for the introduction of the inert gas for conveying the catalyst are provided in bunker 4.

A heater 7 is provided outside of reaction chamber 1 between outlet 3 and the actual reaction zone 8 for preheating the catalyst before it enters the reaction zone. The reaction zone is preferably maintained in the lower end of reaction chamber 1 by suitable adjustment of the temperature and gas velocities and inlet 9 is provided just below the beginning of such reaction zone so that the reaction gases are reacted as quickly as possible after introduction into the reaction chamber. An external heater 10 is provided above inlet 9 and surrounding the lower portion of the reaction zone. This heater serves to initiate the reaction when the apparatus is first put into operation and is shut off as soon as the reaction has started sufficiently to provide the necessary heat for continued operation. A further inlet 11 is provided at about the same height as inlet 9 through which a cool flushing gas can be introduced into the reaction chamber in case of overheating. A valve 13 is provided in the line 12 for the flushing gas which is connected by relays (not shown) to thermostats 14 arranged along reaction zone 8, which automatically open such valve when overheating occurs. A throttle 16 is also provided in line 15 for the reaction gases, which throttle also is coupled with thermostat 14 and automatically operated thereby. A bucket wheel 18 is provided at the lower end of reaction chamber 1 for the continuous removal of the spent catalyst. At the foot of the column of spent catalyst, opening 19 is provided for the introduction of inert diluent gas which is for example supplied over a ring conduit 20. Preferably a number of symmetrically distributed inlets are provided for the introduction of the diluent gas so that it is uniformly passed through the spent catalyst for preheating.

According to another modification of the invention the reaction chamber can be subdivided into a plurality of reaction tubes which are housed in a common vessel. This modification of the apparatus is schematically shown in Fig. 2 in which only the significant parts of the apparatus are shown. In this modification the catalyst passes downwardly through reaction tubes 21 and is removed from the lower end thereof by a rotating perforated plate 22. Openings 23 are located in such plate in such a manner that they register with the bottom openings in tubes 21 in certain positions. A stationary perforated plate 24 is provided below perforated plate 22. As may be seen from Figs. 3 and 4, the openings 25 of plate 24 are located so that they register with the openings 23 in plate 22 after it has rotated 45° beyond the point when such openings registered with the bottom openings of tubes 21 and permit the spent catalyst carried in openings 23 to fall out through openings 25. When openings 23 are in registry with openings 25 the surface between the openings supports the catalyst in tubes 21. The gas inlets and outlets as well as the heating arrangements not specifically shown in Fig. 2 correspond substantially to those shown in Fig. 1.

The bucket wheel as well as the rotating horizontal plate shown in Figs. 1 and 2 both permit very accurate and reproduceable removal of certain quantities of spent catalyst and thereby a simple regulation of the speed the catalyst passes through the reaction chamber. The quantity of catalyst removed can be regulated either by altering the speed that the bucket wheel or perforated plate rotates or by decreasing the volume of the buckets or the openings in the perforated plate by fitting suitable inserts in such buckets or openings.

Example 1

As a reaction vessel an inwardly drawn and polished tube is used which is made of a low alloy steel consisting of 8.3% Cr, 0.95% Si, 1.4% Al, remainder Fe, no Ni, no Cu. The tube has an interior diameter of 48 mm. and a length of 2.200 mm. At its upper and lower end the tube is provided with slits (openings) with a width of 1.5 mm. and a length of 50 mm. each. Around these slits (openings) an annular chamber is arranged which simultaneously serves for the introduction and the outlet of the gases (inlet at the bottom of the upright tube and outlet at the head of the tube). At a height of 700 mm. the reaction tube is encased by an annular channel the latter being connected with the interior of the reaction tube by means of holes. Through this annular channel the cool flushing gas which has a higher pressure than the used synthesis reaction gases may be passed. Above and below the annular channel suitable thermocouples are provided in the tube which, however, do not hinder the downward sinking flow of the contact in the tube. At the lower as well as at the upper part of the tube a strong electric winding is provided which is coupled through a relay with two thermostats in order to quickly obtain and maintain the desired temperatures of about 500 to 700° C. in the reaction tube. For the purpose of the immediate and unhindered introduction of the flushing gas into the reaction zone at a maximum temperature in the reaction tube and in proportion to the rising temperature in the reaction chamber the thermocouple at the upper part of annular channel is connected with the flushing gas line by means of a regulator. The line to the reaction chamber is provided with a suitable checked valve which serves for the regulation of larger quantities of flushing gas and the respective increase of pressure. A throttle is provided in the outlet of the reaction gases which throttle automatically operates the pressure above atmospheric when larger quantities of flushing gas are introduced in the reaction tube. At the upper end of the reaction tube a distributing valve is connected with a bunker which contains the contact and is kept under nitrogen. The bunker is equipped with a tightly closing funnel tube and a distributing valve for the contact substance. At the lower end of the reaction chamber the tube is provided with a Liebig cooler and a bucket wheel for the continuous removal of the spent catalyst. At the foot of the column of spent catalyst nitrogen may be introduced in the direction to the reaction chamber.

The contact consists in a carrier substance of active carbon with a weight of about 400 g. per liter taking up 21% in benzene from an air current one thousandths saturated with benzene. This active carbon with a grain of about 4 to 6 mm. diameter was impregnated with 113 grs. of potassium cyanide per liter and 32 grs. of barium hydroxide per liter and pre-dried in a nitrogen flow at a temperature of about 220° C.

Before initiating the operation the reaction tube is filled with the prescribed contact substance up to the bucket wheel over the upper bunker whilst the presence of oxygen is carefully avoided. The reaction tube is then filled with nitrogen over the bucket wheel and the reaction vessel heated. Up to the annular flushing gas channel a maximum temperature of about 685° C. is maintained whilst in the upper part of the reaction vessel a temperature of about 550° C. is maintained.

In routine tests the dancing point of the catalyst employed was ascertained with 0.48 m./sec. In accordance therewith the current velocity of the reaction gases is maintained at a speed of 0.49 and 0.55 m./sec. After a respective adjustment of the bucket wheel the contact slightly pressed by the movement of the contact contained in the bunker is wandering with a velocity of about 2 m./h. through the tube from top to bottom. A quantity of 3.25 cbm./h. of nitrogen is then passed into the reaction chamber and after half an hour save for a rest of 0.9 cbm. the whole nitrogen heated to a temperature of about 220° C. is substituted by a mixture of 135 parts by volume of acetylene and 100 parts by volume of hydrocyanic acid, pre-heated to a temperature of about 210° C. This reaction very soon leads to an overheating of the reaction chamber thereby automatically starting the action of thermostats and relays. As soon as the temperature has reached 635° C. above the flushing gas channel the cooling nitrogen flushing is automatically operated and the inlet of fresh reaction components stopped. When an approximate equilibrium is attained in the introduction of the synthesis reaction gas mixture and the flushing gas, the bucket wheel is started for a period of about one hour and the contact wanders through the reaction zone. At this optimum of the reaction about 50 moles per hour of acetylene and 37 moles per hour of hydrocyanic acid are passed through the reaction chamber. After passing the reaction tube some coal dust dragged along and small amounts of highly volatile products of no value are separated from the gaseous mixture at a temperature of about 100° C. The acrylonitrile is then recovered from the gases whilst cooling and washing with water. The acrylonitrile contains only slight impurities (by-products and decomposition products of hydrocyanic acid) which can easily be removed. A twenty days' test gave the following results:

Acrylonitrile formed, 35.6 mol/h.=1.885 kgs.
Hydrocyanic acid found, 0.95 mol/h.
Other reaction products, incl. NH$_3$, calculated as nitrogen, 0.25 mol/h.
Losses, 0.2 mol/h.

The average throughput calculated on the hydrocyanic acid employed was 96.7% and, considering the recovered hydrocyanic acid, a yield of more than 98% was obtained. The calculated yield on one liter of the reaction zone in one hour is 0.523 kgs. of acrylonitrile. Calculated on acetylene a throughput of more than 71% may be obtained in one single charge. The recovered mixture of acetylene and nitrogen may be recycled to about 80%. The remaining 20% of both these constituents will be separated as usual and the substances subjected once more to the aforementioned process.

Example 2

The apparatus as described in Example 1 is operated with a synthesis gas mixture obtained by converting hydrocarbons and nitrogen in an electric arc reaction instead of the gas mixture containing nitrogen, acetylene and HCN. This synthesis gas mixture with a diluted content of acetylene and HCN enters the reaction chamber at a temperature of about 560° to 575° C. The temperature of the main reaction zone is maintained at about 670° C. Additional flushing gas is only supplied by means of the bucket wheel and, if necessary, through the flushing gas line controlled by the relay.

The synthesis gas mixture has the following composition before it enters the reaction chamber:

|  | Percent |
|---|---|
| Nitrogen | 16. |
| Hydrogen | 45.5 |
| HCN | 11.9 |
| Acetylene | 10.1 |
| Acetylene homologues | 1.5 |
| Methane | 5.9 |
| Steam | 9.1 |

After the reaction has finished the gas mixture is rapidly cooled down and in counter current washed with water under pressure (about 20 atm. excess pressure) at a temperature of about 2° C. The remaining gases containing 18 parts of nitrogen, 45.4 parts of hydrogen and 5.8 parts of methane may be used otherwise.

Out of the wash water the following compounds are worked up (based on an hourly output):

Acrylonitrile, 12.6 moles=672 grs. per hour.
Acetylene, 2.0 moles=106 grs.
HCN, 4.1 moles= 110.5 grs.
Acetylene homologues, basic aromatics, aliphatic higher nitriles and the like 97 grs.

The throughput, based on acetylene, is about 86% and, based on HCN, 73%; in spite of the strongly diluted gases the yields are extremely high, i. e. 99% of acetylene and 96 to 97% of HCN. The contact cooled when passing to the bucket wheel and flushed with nitrogen is recycled in a nitrogen atmosphere after separation of the fines and the superficially formed carbon black. In longer intervals a regeneration of the used up contact might prove to be necessary. The regeneration is carried out by means of flowing superheated steam in admixture with nitrogen and subsequent degasification in vacuo.

We claim:

1. In a method for the preparation of acrylonitrile by reacting acetylene with hydrogen cyanide in the vapor phase in the presence of a solid catalyst at temperatures of about 450° to 700°, the steps which comprise passing a reaction gas containing acetylene and hydrogen cyanide upwardly through the catalyst in a reaction zone, said catalyst being continuously passed downwardly through the reaction zone countercurrent to the reaction gas, the catalyst being introduced into the upper end of the reaction zone as fresh catalyst and being withdrawn from the lower end as spent catalyst and the velocity of the reaction gas being below the dancing point of the catalyst and being between 200 to 1500 times the velocity of the catalyst which is passed countercurrently thereto through the reaction zone.

2. The method according to claim 1 in which the velocity of the reaction gas is 500 to 1000 times the velocity of the catalyst which is passed countercurrently thereto through the reaction chamber.

3. In a method for the preparation of acrylonitrile by reacting acetylene with hydrogen cyanide in the vapor phase in the present of a solid catalyst at temperatures of about 450° to 700°, the steps which comprise passing a reaction gas containing acetylene and hydrogen cyanide upwardly through the catalyst in a reaction chamber and continuously passing the catalyst downwardly through the reaction chamber countercurrent to the reaction gas, the catalyst being introduced into the upper end of the reaction chamber as fresh catalyst and being withdrawn from the lower end as spent catalyst, maintaining a reaction zone in the catalyst passing downwardly through the reaction chamber intermediate of the upper and lower ends of the reaction chamber and introducing the reaction gas into the reaction chamber just in front of the reaction zone, the velocity of the reaction gas being below the dancing point of the catalyst and being between 200 and 1500 times the velocity of the catalyst which is passed countercurrently thereto through the reaction zone.

4. The method according to claim 3 in which said reaction gas is diluted with an inert gas and at least a portion of the inert gas is introduced into the reaction chamber separately from said acetylene and hydrogen cyanide.

5. The method according to claim 4 in which said separately introduced inert gas is preheated by being passed through the catalyst in the reaction chamber after it has left the reaction zone.

6. The method according to claim 4 in which said separately introduced inert gas is preheated by heat exchange with the gaseous reaction products.

7. The method according to claim 1 in which said reaction gas is an acetylene and hydrogen cyanide containing gas obtained by reacting a hydrocarbon with an excess of nitrogen in an electric arc.

8. The method according to claim 7 in which the acetylene and hydrogen cyanide containing gas obtained by the electric arc process is cooled to a temperature below 650° C. and introduced directly into the reaction chamber without special purification.

9. The method according to claim 8 in which acetylene and hydrogen cyanide containing gas obtained by the electric arc process is cooled to a temperature between 550° and 600° C. and introduced directly into the reaction chamber without special purification.

10. The method according to claim 3 in which the catalyst is preheated within the reaction chamber on its way to the reaction zone so that it enters the reaction zone with a temperature of 450° to 580° C.

11. The method according to claim 3 in which the catalyst is preheated within the reaction chamber on its way to the reaction zone so that it enters the reaction zone with a temperature of 520° to 550° C.

12. The method according to claim 1 in which active carbon is employed as the catalyst.

13. The method according to claim 1 in which activated wood charcoal is employed as the catalyst.

14. The method according to claim 1 in which activated wood charcoal containing an alkali metal hydroxide is employed as the catalyst.

15. The method according to claim 1 comprising in addition subjecting the catalyst to a vacuum treatment to remove air contained therein before introducing such catalyst into the reaction chamber.

References Cited in the file of this patent

UNITED STATES PATENTS

| Number | Name | Date |
|---|---|---|
| 2,413,496 | Green et al. | Dec. 31, 1946 |
| 2,414,762 | Owen et al. | Jan. 21, 1947 |
| 2,419,186 | Harris et al. | Apr. 15, 1947 |
| 2,433,182 | Wolk | Dec. 23, 1947 |
| 2,561,787 | Denton et al. | July 24, 1951 |
| 2,692,276 | Goerg et al. | Oct. 19, 1954 |
| 2,744,926 | Koons | May, 8, 1956 |

FOREIGN PATENTS

| 135,340 | Australia | Nov. 17, 1949 |